INVENTOR
GRAY MILLER JR.
ATTORNEY

Dec. 28, 1943.    G. MILLER, JR    2,337,617
GOGGLE
Filed April 11, 1940    2 Sheets-Sheet 2

INVENTOR
GRAY MILLER JR.
By
ATTORNEY

Patented Dec. 28, 1943

2,337,617

UNITED STATES PATENT OFFICE 2,337,617

GOGGLE

Gray Miller, Jr., Westmount, Quebec, Canada; James C. Gahan, Jr., Belmont, Mass., administrator of said Gray Miller, Jr., deceased, assignor to Polaroid Corporation, Dover, Del., a corporation of Delaware Application April 11, 1940, Serial No. 329,189

2 Claims. (Cl. 2—14)

This invention relates to goggles.

The applicant has observed that most goggles and glasses, particularly of the cheaper types, have the disadvantage of reflecting images and light into the eyes from the inner surface of the lens. This is principally due to their body portions or lenses being flat, or only of slight curvature, so that they act in effect as rear view mirrors. This disadvantage of rearward reflection is much more marked in a tinted or coloured body portion or lens. This is for the well known reason that transparent coloured material reflects more light than a clear material, which transmits most of the light.

Lenses ground to prescription, as in conventional spectacles, avoid these annoying side reflections to some extent by reason of their concavity. Spectacles, however, are not sufficiently expansive to give full protection against bright sunlight, glare and wind, and, besides, properly ground lenses are too expensive for mere use as sunglasses and have other disadvantages, as compared with a plastic article.

The main object of the present invention is to provide an eye protective shield or goggle combining the advantages of a plastic article with those of lensed glasses. It is a further object of the invention to provide a very simply constructed article of this nature giving a maximum field of protected, yet unobstructed, vision. It is a further object to provide a shield of this nature which is so constructed as to be completely free from undesirable reflections. A still further object is to provide such a shield which is convenient for carrying when not in use. A still further object is to provide means of forming a normally-flat sheet of plastic material into sunglasses.

With these objects in mind, a shield constructed according to the invention includes a relatively large body portion made of a single normally-flat piece of plastic, giving a full range of vision and tinted to reduce light intensity and sun glare. The body is attractively shaped to accommodate the features. Means is included in the shield to give the body a curvature suitable in reducing undesirable reflections. Ear pieces or other suitable members are attached to the body to hold the shield in place.

The nature of the invention will be more completely understood by reference to the accompanying drawings illustrating preferred embodiments, and in which:

Figure 1 is a view of the separate parts of one preferred embodiment of the goggle constructed according to the invention, these parts being a blank for forming the body portion of the goggle shown laid out flat; a spring band for shaping the body portion, shown both in plan (as if looking down on the goggle) and in side elevation; and a strip of plastic for lamination to the body to hold the spring band in position.

Detailed description

Figure 1:
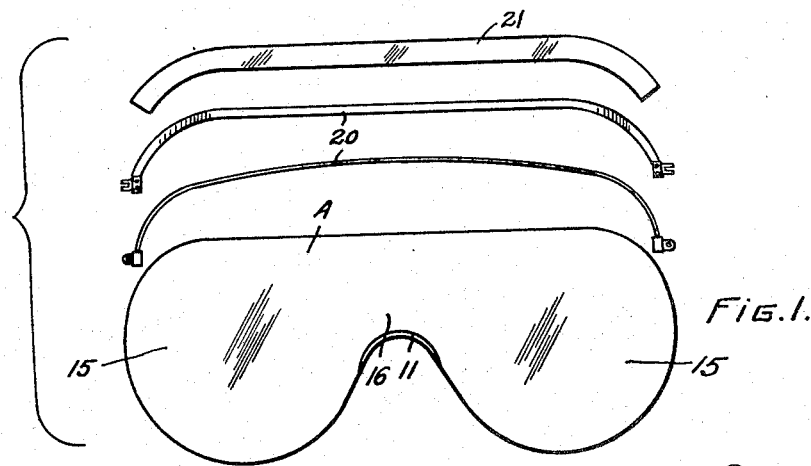
Figure 2:
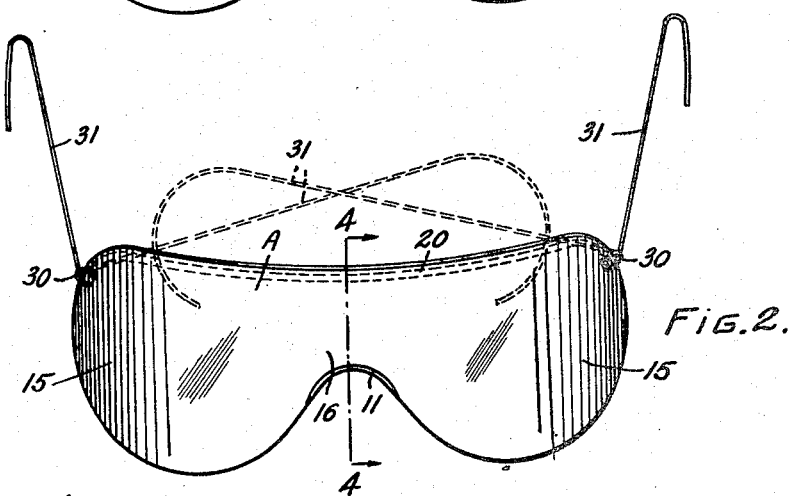
Figure 2 is a front perspective view of the form of goggle of Figure 1, assembled.
Figure 3:
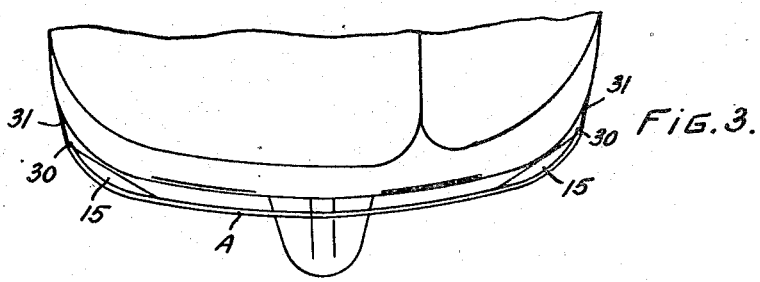
Figure 3 is a top plan view of the goggle shown in Figure 2.
Figure 4:
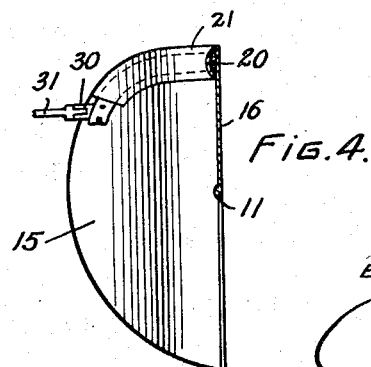
Figure 4 is an enlarged cross section along the line 4—4 of Figure 2.

The preferred form of goggle indicated in Figures 1 to 4 includes a body A made up of a single sheet of normally flat plastic material. The body is shaped to include a nose recess 11 intervening widely extending eye-protecting portions 15, connected by the integral bridging portion 16. The top of the nose recess is provided with an inturned and thickened edge portion and the remainder of the lower and side edges of the sheet material are merely rounded.

The upper edge of the body is substantially straight throughout the majority of its length but rounded at the sides of the shield. Co-extensive with the upper edge is a spring band 20, whose function is to give the surface of the goggle a desired curvature, as will be explained. For this purpose the band 20 is constructed so that it will normally assume the curvature desired in the goggle. In the preferred embodiment, it takes the form of a steel spring having sufficient strength to counteract the tendency of the plastic to retain its original flatness. The curvature of the band is capable of being reduced with that of the body by the application of pressure but readily springs back into shape upon removal of such pressure.

In this preferred form the surface curvature of the body is slight in the midportion, the marked curvature beginning towards the middle of the eye-protecting portions, and increasing towards the sides of the shield until the body, at the edges, is approaching right angles to the middle of the goggle, that is, to the bridging portion 11. The body of this shape is free from the undesirable reflections which are so prevalent in flat devices. It is in this respect that it has the advantage of a lens, but at the same time embraces a much larger range of vision, is more economical to construct, being of flat sheet plastic, and enjoys the many other advantages of a plastic article.

It should be emphasized here that it is possible to form and furnish a flat sheet of plastic material of very uniform thickness which, therefore, has excellent optical properties and which will retain these properties when bent into curved form, as for instance according to the invention. On the other hand, in the case of a body moulded to achieve the curved form, it is impossible, from a practical standpoint, to obtain good optical properties, because of the difficulty of getting uniform thickness.

The band 20 may be connected to the upper marginal edge of the body in any suitable manner. In the form shown, the band is held between the margin of the body and a strip 21 laminated to it. The ends of the band are turned downwards at the sides of the goggle. In the form shown, end pieces 30 are connected to the ends of the band 20 as well as to the plastic body, and ear pieces 31 are hinged to the end pieces.

It will be understood that this preferred form may be modified in various respects, for instance, the flexible band may be attached to the upper marginal edge of the goggle in alternative ways. The ends of the band need not be turned down as indicated and the ear pieces may be secured to end pieces attached to the body of the goggle. Instead of the nose portion of the body having a rounded edge to rest on the nose, conventional projecting nose pieces may be provided.

Operation

The goggle is worn in a similar manner to spectacles, with the nose rest supporting it and the ear pieces holding it in place like spectacles, substantially in a vertical position. The eye-protecting portions cover the entire field of vision, extending directly across the front of the face and curving inwards at the side with the ear pieces attached out of the useful field of vision. The inward curvature of the side portions of the goggle prevents rays of light from the side or the rear from striking the rear surface of the goggle at an angle at which they could be reflected into the eyes.

Figure 5:
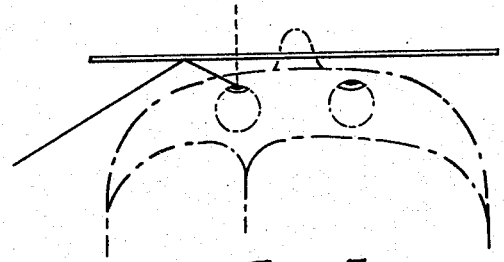
Figure 5 is a diagrammatic plan view showing the reflection of light rays from the rear surface of a flat goggle.
Figure 6:
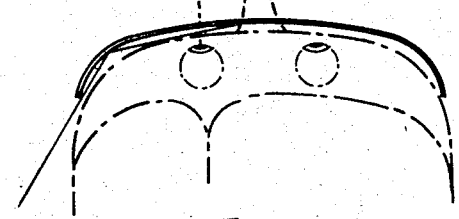
Figure 6 is a similar view to Figure 5, but showing the reflection of light rays from the rear surface of a goggle shaped according to the present invention, as for instance, the goggle of Figures 1 to 4.

The operation of the goggle as regards elimination of undesirable reflections from the under surface as compared with a conventional flat goggle or lens, is best illustrated in Figures 5 and 6. Figure 5 indicates in a diagrammatic plan view (looking from above) the relative position of a flat goggle to the eyes of a wearer. It will be seen that rays of light coming from behind striking the goggle at certain angles are reflected directly into the eyes, the angle of incidence equalling the angle of reflection. Figure 6 illustrates the action of the applicant's goggle in respect to light rays from behind. It will be seen that in contrast to the flat goggle the rays cannot strike the rear surface of the goggle in such a direction that they could enter the eyes. Any angle of incidence would have to be most acute, in which case the angle of reflection would also be most acute and the rays could not, as clearly indicated by the figure, enter the eyes.

The shape of the goggle is also important in enabling the ear pieces to be connected in a desirable manner. The ear pieces should be made of flexible material so that the ear-encircling portions may be bent to make the shield fit the individual wearer. That is, he is enabled to adjust the position of the goggle on his nose closer or further away from his eyes.

Advantages

The advantages of a goggle of the kind described are numerous. The widely extending tinted surface gives full protection from sun, glare and wind, but, at the same time, leaves a completely unobstructed field of vision. The goggle is not unsightly and is streamlined. It is of a safe non-shatterable material. The surface curvature of the body portion eliminates the annoying reflections on the inner side, common in flat goggles. The marked curvature towards the sides of the shield is also advantageous in bringing the ear pieces completely behind the useful range of vision. Owing to the curvature of the goggle at the side, the ear pieces may be mounted in a favourable position to take advantage of the shape of the head—that is they are above the cheek bones and run substantially horizontally between the top of the goggle and the ears. Its construction is so relatively simple that it can be made more economically than spectacles and than most of the shields now in general use. The use of a normally flat sheet of material renders manufacturing extremely easy and economical, with no difficulty in achieving good optical properties.

Besides these advantages, the goggle enjoys all the attributes common to a plastic article as compared with one made from a shatterable material. For instance, it will not injure the face if forced against it in a fall and so is particularly desirable for children's use. Moreover, its extreme light weight makes the wearer unconscious of having anything on his nose.

Alternative forms

Figure 7:
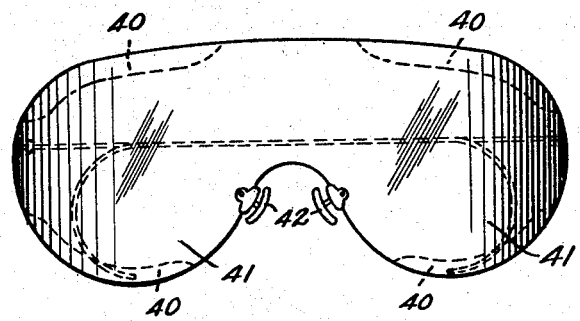
Figure 7 is a front elevation of an alternative form of goggle according to the invention.
Figure 8:
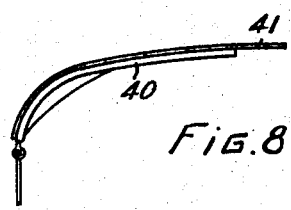
Figure 8 is a fragmentary plan view showing the corner of the goggle shown in Figure 7.

An alternative form of goggle is indicated in Figure 7. In this form, reinforcing pieces 40 of plastic material are laminated or welded to the under surface of the body at the top and bottom margins, substantially as indicated in the figure or only at the top margin, in such a way as to force it into the desired curvature. The structure is such that the tension exerted by the inner lamination will pull the goggle into operative shape. The same effect might also be achieved instead by rolling the edge of the plastic body inward.

Figure 9:
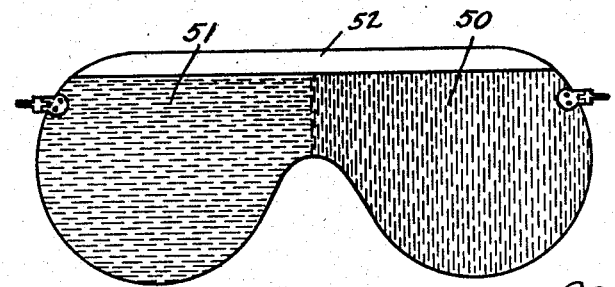
Figure 9 is an elevation showing a device constructed according to the invention for viewing three-dimensional pictures.

The invention also lends itself to another use, that is in the construction of a viewer for three-dimensional motion pictures. For this purpose a goggle is constructed according to Figure 9, in which one half 50 is polarized in one plane and the other half 51 in a plane at right angles to it. The structural features described above may be applied to the shield so that its simplicity and other advantages are enjoyed.

It will be understood that various modifications may be made in this invention without departing from the spirit thereof or the scope of the claims.

and therefore the exact forms shown are to be taken as illustrative only and not in a limiting sense, it being desired that only such limitations shall be placed thereon as may be imposed by the state of the prior art or are set forth in the accompanying claims.

I claim:

1. A goggle comprising a normally flat flexible sheet of transparent material having eye covering portions and a nose recess in the lower edge thereof, a resilient member extending along an edge of the sheet and being secured thereto throughout substantially its full length, said resilient member being normally bowed with a tension sufficient to impose in the sheet a curvature such that when in position of use, light rays striking the inner surface of the sheet will be reflected away from the eyes of the wearer, the resilient member and attached sheet being readily yieldable to pressure to flatten same and the tension of the resilient member acting to automatically return the sheet to curved condition upon release of said pressure, and means for retaining the goggle in position on a wearer's face.

2. A goggle comprising a normally flat flexible sheet of transparent material having eye covering portions and a nose recess in one edge thereof, a spring band secured throughout substantially its full length by an overlying strip of material to an edge portion of the sheet and providing a laminated structure, said band being normally bowed with a tension sufficient to impose in the attached sheet a curvature such that when in position of use, light rays striking the inner surface of the sheet will be reflected away from the eyes of a wearer, the band and attached sheet being readily yieldable to pressure to flatten same and the tension of the band acting to automatically return the sheet to curved condition upon release of said pressure, and means for retaining the goggle in position on a wearer's face.

GRAY MILLER, JR.